United States Patent
Um

(10) Patent No.: US 7,095,761 B2
(45) Date of Patent: Aug. 22, 2006

(54) DPSS LASER

(75) Inventor: Kee Tae Um, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 10/750,848

(22) Filed: Jan. 5, 2004

(65) Prior Publication Data

US 2004/0136431 A1   Jul. 15, 2004

(30) Foreign Application Priority Data

Jan. 6, 2003   (KR) .................. 10-2003-0000629

(51) Int. Cl.
*H01S 3/098* (2006.01)
*H01S 3/091* (2006.01)
*H01S 3/08* (2006.01)

(52) U.S. Cl. .................. 372/19; 372/70; 372/99
(58) Field of Classification Search .................. 372/19
See application file for complete search history.

(56) References Cited

U.S. PATENT DOCUMENTS 5,181,223 A * 1/1993 Baer et al. .................. 372/69

FOREIGN PATENT DOCUMENTS

JP   2000-269576   9/2000
JP   2002-70926    9/2002

* cited by examiner

*Primary Examiner*—Armando Rodriguez
(74) *Attorney, Agent, or Firm*—Fleshner & Kim, LLP

(57) ABSTRACT

Disclosed is a side pumping type DPSS (Diode Pumped Solid-State) laser having a high efficiency of pumping light together with a large output of the laser power. The DPSS laser includes a first laser chip for generating a pumping light, a second laser chip provided at a predetermined degree to be slightly slanted, although being parallel with the first laser chip, so as to avoid a contact with the pumping light, a first and second focusing lens for focusing the pumping lights, and a side pumping medium for forming the focused pumping lights in a beam mode so as to output as a lasing light.

10 Claims, 3 Drawing Sheets

DPSS LASER

CROSS-REFERENCE TO RELATED APPLICATIONS

This application claims the benefit of Korean Application No. P2003-00629, filed on Jan. 6, 2003, which is hereby incorporated by reference as if fully set forth herein.

BACKGROUND OF THE INVENTION

1. Field of the Invention

The present invention relates to a solid-state laser, and more particularly, to a DPSS (Diode Pumped Solid-State) laser.

2. Discussion of the Related Art

In general, a DPSS laser has high efficiency and a large output-power in a relatively small size compared to a regular laser. Accordingly, there is an increasing trend of applying the DPSS laser to an industrial technology such as marking or cutting. Furthermore, recently, the DPSS laser is in a process of development as a display light source owing to characteristics of a small size, high efficiency, and the large output.

The DPSS laser is divided into an end pumping type and a side pumping type. Hereinafter, the DPSS laser will be described in more detail referring to appended drawings. FIG. 1 is a drawing of an end pumping type of DPSS laser. As illustrated in FIG. 1, when a pumping light radiated from a laser diode (LD) 110 is incident upon a laser material 140 after passing through a focusing lens 120, the DPSS laser forms the pumping light in beam mode at the laser material 140 so as to output a lasing light through an output coupler 150.

In this case, PR (partial reflection) coating 130 for the lasing wavelength is formed on a front surface of the laser material 140 for transmitting only a part of the radiated pumping light.

The end pumping type of DPSS laser has efficiency and an advantage in forming the radiated light in beam mode because the lasing area of the laser material 140 overlapping the radiating area of the laser light is large.

However, the end pumping type of DPSS laser has a predetermined limitation in a large output of the laser power owing to a heat lens phenomenon.

FIG. 2 illustrates a drawing showing a side pumping type DPSS laser in accordance with a related art. As illustrated in the drawing, when the pumping light radiated to the two laser diodes 210_A and 210_B provided at both sides of the laser material 240 is transmitted through the laser material 240, the pumping light is formed in the beam mode at the laser material 240 so as to output the lasing light through the output coupler 250 in the DPSS laser.

In this case, only the part of the PR (partial reflection) coating for a lasing wavelength is formed on a front surface of the laser material 240. On a rear surface of the laser material 240, the lasing light proceeds in one direction because HR (high reflection) coating 260 for the pumping wavelength is formed and totally reflected.

Although the DPSS laser of the side pumping type is advantageous for a large output owing to a prolonged lasing area, efficiency of the pumping light is lowered and there is a disadvantageous problem in forming the beam mode.

If the laser is employed as a display light source, a condition for the large output of the laser power, efficiency of the pumping light, and a small size production needs to be satisfied.

Therefore, a development of the laser is needed for enabling lasing with a large output and improving the efficiency of the pumping light by elongating a length of the laser material.

SUMMARY OF THE INVENTION

Accordingly, the present invention is directed to a side pumping type DPSS laser that substantially obviates one or more problems due to limitations and disadvantages of the related art.

An object of the present invention is to provide a side pumping type DPSS laser having a high efficiency of pumping light together with a large output of the laser power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a side pumping type DPSS laser includes a first laser chip for generating a pumping light, a second laser chip provided at a predetermined degree to be slightly slanted, although being parallel with the first laser chip, so as to avoid a contact with the pumping light, a first and second focusing lens for focusing the pumping lights, and a side pumping medium for forming the focused pumping lights in a beam mode so as to output as a lasing light.

In this case, the side pumping light includes a laser material manufactured in a plate type, a sapphire plate formed at both sides of the laser material and having an AR coating and HR coating alternatively provided on each side of the laser material, a copper block provided at a top of the sapphire plate for fixing the sapphire plate and transmitting heat to outside, HR coating formed on a rear surface of the side pumping medium for reflecting radiated lasing light, and PR coating formed on a front surface of the side pumping medium for transmitting a part of the lasing light.

In another aspect of the present invention, further includes a stop coating formed between the PR coating and the laser material for filtering all the pumping light, and a middle portion thereof is removed for filtering all lights except a light in a pumping light lasing mode.

Also, perpendicular component of the light radiated to the predetermined surface is focused and parallel component of the light is radiated parallel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
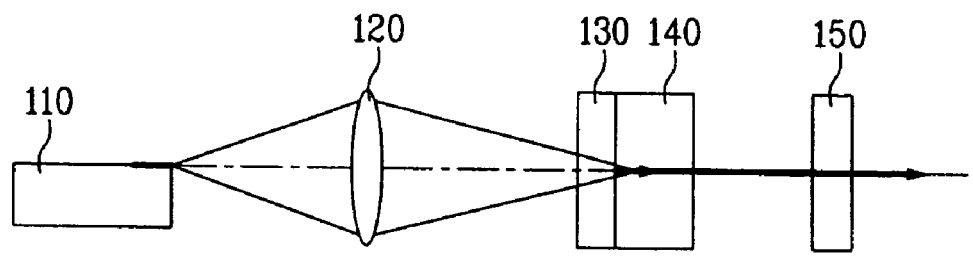
FIG. 1 illustrates a diagram showing an end pumping type of DPSS laser.
Figure 2:
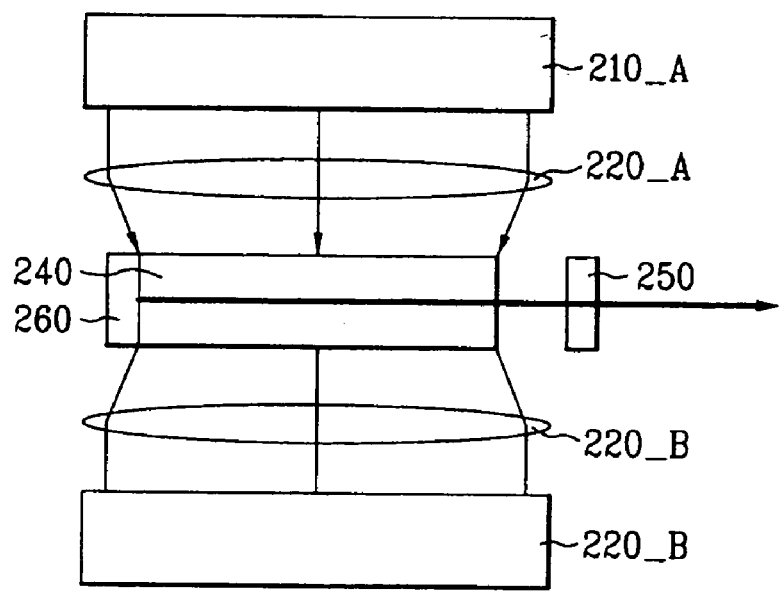
FIG. 2 illustrates a diagram showing a side pumping type of DPSS laser.
Figure 3:
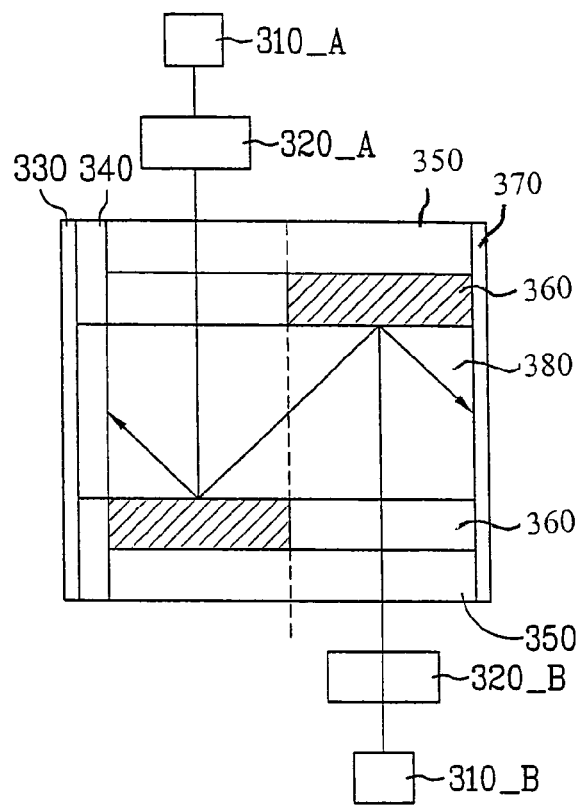
FIG. 3 illustrates a floor plan showing a side pumping type of DPSS laser in accordance with a first embodiment of the present invention.

FIG. 3 illustrates a diagram showing a side pumping type of DPSS laser in accordance with a first embodiment of the present invention.

As illustrated in FIG. 3, the DPSS laser includes a laser chip 310_A and 310_B for generating a pumping light, focusing lens 320_A and 320_B for focusing a radiated pumping light, and a side pumping medium 380 (390 of FIG. 4) for generating a lasing light forming the focused pumping light into a beam mode.

The laser chips 310_A and 310_B are parallel around the side pumping medium 380, but provided to be slightly slanted such that the pumping lights are not in contact with each other.

Hereinafter, HR (High Reflection) coating or AR (Anti-Reflection) coating for the laser pumping wavelength and PR (partial reflection) coating for the laser lasing are referred as HR coating or AR coating, and PR coating, relatively.

Figure 4:
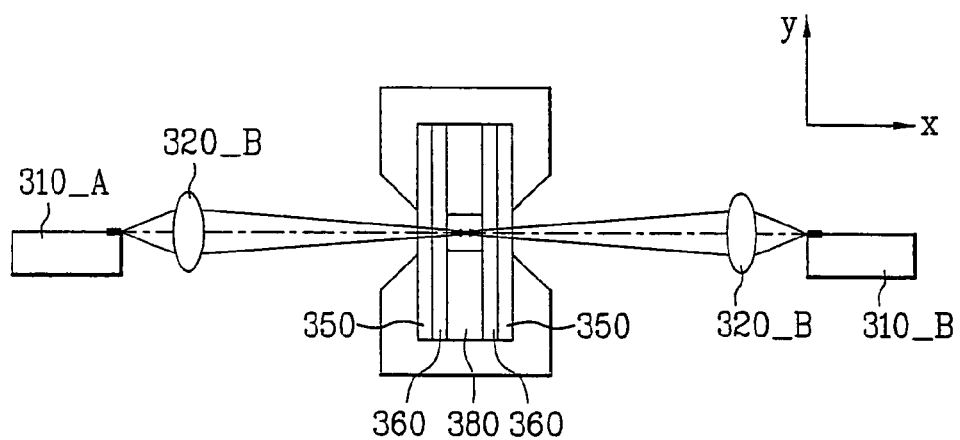
FIG. 4 illustrates a front view showing a side pumping type of DPSS laser in accordance with a second embodiment of the present invention.

The pumping medium 380 (390) is adjoined with a sapphire plate 360 having AR coating and HR coating alternatively formed at both sides of the laser material 380 manufactured in a very thin plate type at a predetermined interval as illustrated in the floor plan of FIG. 3 and a front view of FIG. 4. And, a copper block 350 is adjoined with a top of the sapphire plate 360 for fixing the sapphire plate 360 and transmitting heat to a cool member (not illustrated). Also, HR coating 370 is formed at a rear side of the side pumping medium 380 (390), i.e., an opposite side of a lasing side of the pumping light for totally reflecting an incident light, a stop coating 340 is formed in a thin film type for absorbing all the pumping light on the other side thereof, the stop coating 340 having a middle portion cut for filtering all lights except a light in a mode for lasing the pumping light. On a front surface of the stop coating 340, PR coating 330 is formed for transmitting a part of the lasing light.

In this case, it is desirable that a thickness of the laser material 380 is manufactured in a same size of a beam waist of the lasing laser, and an doping amount of the laser material 380 is a value of the pumping light radiated to and absorbed by the laser material 380 after transmitting through the laser material 380.

The focusing lens 320_A and 320B different from the focusing lens 120, 220_A and 220_B, perpendicular component of the light radiated to the predetermined surface is focused and parallel component thereof is proceeded parallel. Therefore, the perpendicular component of the pumping light generated from the laser chip 310_A and 310_B transmits through the AR coating of the sapphire plate 360 and is focused to the laser material 380. An example of the focusing lens 320_A and 320_B is a toric type micro lens.

In other words, as illustrated in FIGS. 5A and 5B, the pumping light radiated as the side pumping medium 390 is transmitted through the AR coating first and reflected from the HR coating after transmitting through the laser material 380 (700). At this time, the perpendicular component of the radiated pumping light is focused (FIG. 5A), but the parallel component of the radiated pumping light is parallel.

The focusing lens 320_A and 320_B increases pumping efficiency in the side pumping material 380.

A movement the DPSS laser of the side pumping type divided into a pumping and lasing process will be described according to the present invention, the DPSS laser structured as mentioned above.

(1) A pumping process

When the pumping light is radiated from the laser chips 310_A and 310_B, the radiated pumping light is transmitted though the In this case, among the light radiated to the laser material 380, the pumping light not being absorbed by but being transmitted the laser material 380 is reflected by the HR coating of the sapphire plate 360 at an opposite side of the side the pumping light radiated thereto and absorbed to the laser material 380 again.

(2) A lasing process

The pumping light absorbed to the laser material 380 according to the pumping process generates fluorescence. Only the fluorescence satisfying the resonance condition starts resonating by the HR coating 370 and the PR coating 330 formed at both ends of the laser material 380, is resonated into a mode close to a $TEM_\infty$ mode and lased by an operation of the stop coating 340 at a side of the PR coating 330.

Figure 6:
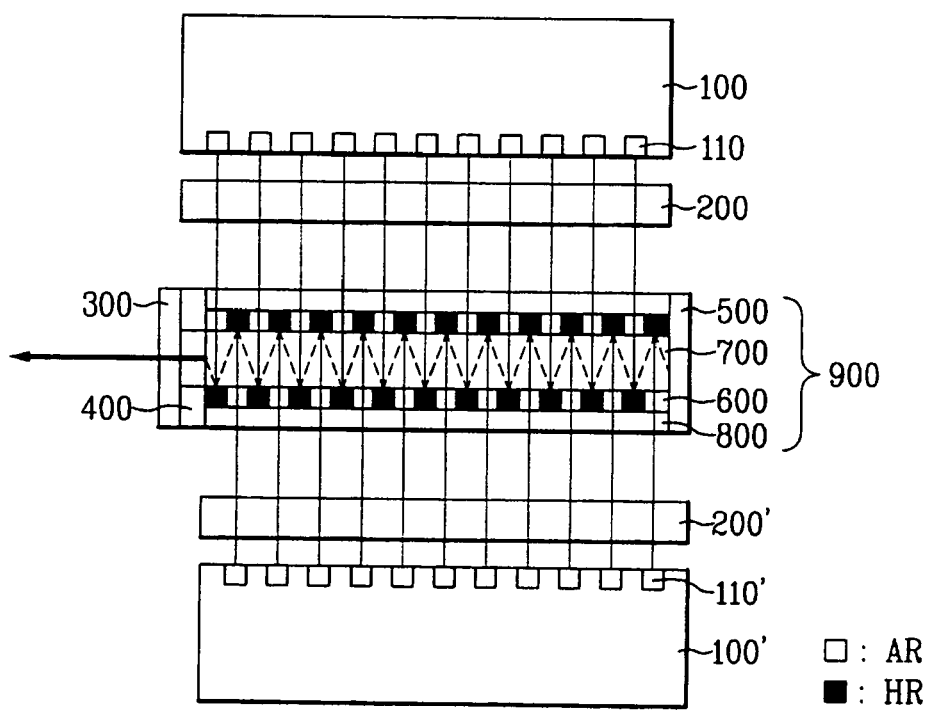
FIG. 6 illustrates a floor plan showing a side pumping type of DPSS laser in accordance with a third embodiment of the present invention.

A third embodiment of the present invention will be described with reference to FIG. 6. FIG. 6 illustrates a floor plan showing a Side pumping type of DPSS laser in accordance with a third embodiment of the present invention.

As illustrated in FIG. 6, the DPPS laser of the side pumping type includes a pumping LD (laser diode) 710_A and 710_B (100, 100')for generating a plurality of pumping light, focusing lens array 720_A and 720_B (200, 200')for focusing each of the pumping lights radiated, and a side pumping assembly 790 (900)for forming the focused pumping light in a beam mode so as to output as a lasing light.

The pumping light LD 710_A and 710_B (100, 100') includes a plurality of laser chips so as to generate a plurality of pumping lights. 8-4 The pumping LD 710_A and 710_B (100, 100') are parallel around the side pumping assembly 790 (900), but are provided to be slanted a predetermined degree to avoid the radiated pumping lights from being in contact with each other.

The focusing lens array 720_A and 720_B (200, 200') are composed of a plurality of focusing lens arranged. The side pumping assembly 790 (900) is adjoined with a sapphire plate 760(600) provided at both sides of the laser material 780(700) manufactured in a very thin plate type and with a copper block 750 (800) at a top of the sapphire plate 760(600) for fixing the sapphire plate 760(600) and transmitting heat to the cooling member (not illustrated), the sapphire plate having AR coating and HR coating alternatively formed thereon at a predetermined interval.

Also, HR coating 770 (500) is formed on a rear side, i.e., an opposite side of a light lasing side of the side pumping assembly 790 (900) and a stop coating 740 (400) is formed in a thin film type for absorbing all the pumping light on an opposite side thereof, a middle portion of the stop coating is removed for filtering all lights except a light in a pumping light lasing mode. PR coating 750 (300) is formed for transmitting a part of the lasing light between the stop coating 740 (400) and the laser material 780(700).

Figure 5:
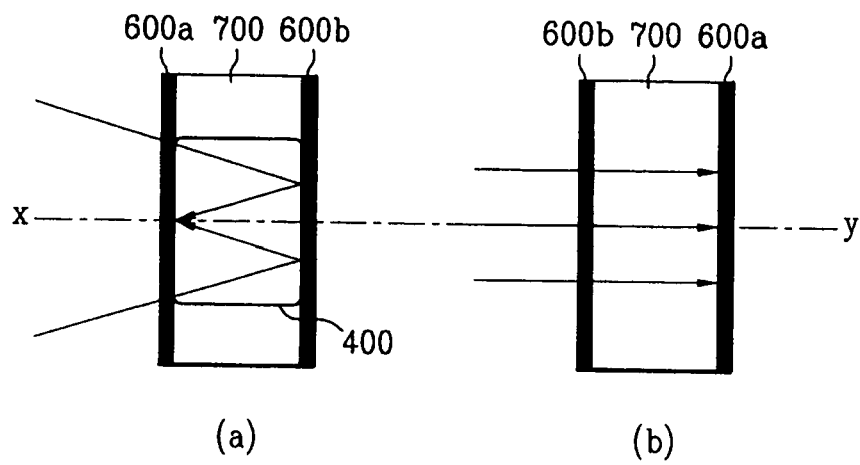
FIG. 5A illustrates a diagram showing a state that a pumping light cluster of a Side pumping type of DPSS laser is perpendicular to a predetermined front surface of in accordance with the present invention.
FIG. 5B illustrates a diagram showing a state that a pumping light cluster of a Side pumping type of DPSS laser is parallel to a predetermined front surface of in accordance with the present invention.

Hereinafter, the pumping and lasing processes are very similar to the description of FIG. 4 to FIG. 6 and will be omitted.

As aforementioned, the DPSS laser of the side pumping type in accordance with the present invention has an effect of increasing the light efficiency by making the laser material thin, being joined with the sapphire plate having the AR and PR coatings, and focusing the pumping light with the micro lens so as to absorb all the pumping light in the lased area 9–15.

Also, by adjoining the sapphire plate having high heat conduction to the laser material, heat generated at the laser material is quickly transmitted to the cooling member. Therefore, there is an effect of decreasing the heat lens problem.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A side pumping type Diode Pumped Solid-State (DPSS) laser, comprising:
    a first laser chip for generating a pumping light;
    a second laser chip, the second laser chip generating a second pumping light, the second laser chip, although being parallel with the first laser chip, slightly slanted to a predetermined degree so as to avoid a contact between the pumping light and the second pumping light;
    a first and second focusing lens for focusing the pumping lights; and
    a side pumping medium for forming the focused pumping lights in a beam mode so as to output as a lasing light, wherein the side pumping medium comprises:
        a laser material manufactured in a plate type;
        partial reflection (PR) coating formed on a front surface of the side pumping medium for transmitting a part of the lasing light; and
        a stop coating formed between the PR coating and the laser material for filtering the pumping lights, and a middle portion thereof being removed for filtering all lights except a light in a pumping light lasing mode.

2. The side pumping type DPSS laser of claim 1, wherein the side pumping medium further comprises:
    a sapphire plate formed at both sides of the laser material and having an anti-reflection (AR) coating and high reflection (HR) coating alternatively provided on each side of the laser material;
    a copper block provided at a top of the sapphire plate for fixing the sapphire plate and transmitting heat to outside; and
    HR coating formed on a rear surface of the side pumping medium for reflecting radiated lasing light.

3. The side pumping type DPSS laser of claim 2, wherein a width of the laser material is in a beam waist size of the lased laser.

4. The side pumping type DPSS laser of claim 2, wherein a doping amount of the laser material is a value of the pumping light radiated to and absorbed by the laser material after being transmitted through the laser material.

5. The side pumping type DPSS laser of claim 1, wherein a perpendicular component of the light radiated to a predetermined surface is focused and a parallel component thereof proceeds in parallel.

6. The side pumping type Diode Pumped Solid-State (DPSS) laser, comprising:
    a first pumping laser diode (LD) generating a plurality of pumping lights;
    a second pumping laser diode (LD), the second pumping laser LD generating a plurality of second pumping lights, the second pumping LD provided to be slightly slanted such that the pumping lights are not in contact with each other although being parallel around the side pumping medium;
    a first and second focusing lens array having a plurality of focusing lens for focusing a plurality of the pumping lights; and
    a side pumping assembly forming the focused pumping lights in a beam mode so as to output as a lasing light, wherein the side pumping assembly comprises:
        a laser material manufactured in a plate type;
        partial reflection (PR) coating formed on a front surface of the side pumping in medium for transmitting a part of the lasing light; and
        a stop coating formed between the PR coating and the laser material for filtering the pumping lights, and a middle portion thereof being removed for filtering all lights except a light in a pumping light lasing mode.

7. The side pumping type DPSS laser of claim 6, wherein a doping amount of the laser material is a value of the pumping light radiated to and absorbed by the laser material after being transmitted through the laser material.

8. The side pumping type DPSS laser of claim 6, wherein a width of the laser material is in a beam waist size of the lased laser.

9. The side pumping type DPSS laser of claim 6, wherein a doping amount of the laser material is a value of the pumping light radiated to and absorbed by the laser material after being transmitted through the laser material.

10. The side pumping type DPSS laser of claim 6, wherein the focusing lens array focus perpendicular component light radiated to a predetermined surface and proceeds parallel component light parallel.

* * * * *